United States Patent
Sato

(10) Patent No.: US 12,390,792 B2
(45) Date of Patent: Aug. 19, 2025

(54) HYDROCARBON REFORMING CATALYST AND HYDROCARBON REFORMING DEVICE

(71) Applicant: Murata Manufacturing Co., Ltd., Nagaokakyo (JP)

(72) Inventor: Hideto Sato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 551 days.

(21) Appl. No.: 17/832,909

(22) Filed: Jun. 6, 2022

(65) Prior Publication Data
US 2022/0297090 A1 Sep. 22, 2022

Related U.S. Application Data

(63) Continuation of application No. PCT/JP2020/040751, filed on Oct. 30, 2020.

(30) Foreign Application Priority Data

Dec. 6, 2019 (JP) .................................. 2019-220967

(51) Int. Cl.
*B01J 21/06* (2006.01)
*B01J 23/00* (2006.01)
(Continued)

(52) U.S. Cl.
CPC ........... *B01J 21/066* (2013.01); *B01J 23/002* (2013.01); *B01J 23/10* (2013.01); *C01B 3/26* (2013.01); *C01B 2203/0227* (2013.01)

(58) Field of Classification Search
CPC ................... B01J 21/066; B01J 23/002; C01B 2203/0227; C01B 3/26
See application file for complete search history.

(56) References Cited

U.S. PATENT DOCUMENTS

2004/0202598 A1  10/2004  Villa
2005/0255993 A1* 11/2005  Tanaka ................... B01J 23/002
                                                        502/302
(Continued)

FOREIGN PATENT DOCUMENTS

AU    6182199 A    4/2000
JP    405200292 A  8/1993
(Continued)

OTHER PUBLICATIONS

Suresh et al., "Synthesis and activity of cobalt-doped barium cerium zirconate for catalysis and proton conduction," in Bansal et al. Advances in Solid Oxide Fuel Cells V, vol. 30, Issue 4 (Ceramic Engineering and Science Proceedings), Wiley-American Ceramic Society, 2009, pp. 167-173.

(Continued)

*Primary Examiner* — Anthony J Zimmer
*Assistant Examiner* — Annette Phan
(74) *Attorney, Agent, or Firm* — ArentFox Schiff LLP

(57) ABSTRACT

A hydrocarbon reforming catalyst that is used in production of a synthesis gas containing hydrogen and carbon monoxide from a hydrocarbon-based gas includes a composite oxide having a perovskite structure, wherein the composite oxide has at least one crystal phase among a first crystal phase containing $BaZrO_3$ as a main component and a second crystal phase containing $BaCeO_3$ as a main component, and contains Rh.

20 Claims, 2 Drawing Sheets

(51) Int. Cl.
  *B01J 23/10* (2006.01)
  *C01B 3/26* (2006.01)

(56) References Cited

U.S. PATENT DOCUMENTS

| | | |
|---|---|---|
| 2009/0269264 A1 | 10/2009 | Saito et al. |
| 2021/0107787 A1 | 4/2021 | Sato |

FOREIGN PATENT DOCUMENTS

| | | |
|---|---|---|
| JP | H05200292 A | 8/1993 |
| JP | H08231204 A | 9/1996 |
| JP | H09168740 A | 6/1997 |
| JP | 2006346598 A | 12/2006 |
| JP | 2015136668 A | 7/2015 |
| JP | 2015224141 A | 12/2015 |
| WO | 2008084785 A1 | 7/2008 |
| WO | 2015082912 A1 | 6/2015 |
| WO | 2020012687 A1 | 1/2020 |

OTHER PUBLICATIONS

Feng et al., "Analysis and Improvement of Chemical Stability of Y-doped BaCeO3 as Proton Conducting Electrolytes in C3H8—O2 Fuel Cells", Journal of New Materials for Electrochemical Systems, 2007, vol. 10, pp. 147-152.
De Caprariis et al., "Rh, Ru and Pt ternary perovskites type oxides BaZr(1-x)MexO3 for methane dry reforming," Applied Catalysis A: General, May 2016, vol. 517, pp. 47-55.
Gallucci et al., "Catalytic combustion ox methane on BaZr(1-x)Mex03 perovskites synthesised by a modified citrate method," Catalysis Today, Oct. 2012, vol. 197, No. 1, pp. 236-242.
International Search Report in PCT/JP2020/040751, mailed Dec. 28, 2020, 3 pages.

* cited by examiner

HYDROCARBON REFORMING CATALYST AND HYDROCARBON REFORMING DEVICE

CROSS REFERENCE TO RELATED APPLICATIONS

The present application is a continuation of International application No. PCT/JP2020/040751, filed Oct. 30, 2020, which claims priority to Japanese Patent Application No. 2019-220967, filed Dec. 6, 2019, the entire contents of each of which are incorporated herein by reference.

FIELD OF THE INVENTION

The present invention relates to a hydrocarbon reforming catalyst that is used in production of a synthesis gas containing hydrogen and carbon monoxide from a hydrocarbon-based gas, and a hydrocarbon reforming device including such a hydrocarbon reforming catalyst.

BACKGROUND OF THE INVENTION

There are known methods for obtaining a synthesis gas containing hydrogen and carbon monoxide from a hydrocarbon-based gas using a catalyst. As catalysts used in a reforming reaction of a hydrocarbon-based gas, there are known a nickel-based catalyst in which nickel is supported on a substrate such as alumina, a ruthenium-based catalyst in which ruthenium is supported (see Patent Document 1), a rhodium-based catalyst in which rhodium is supported on a substrate such as alumina (see Patent Document 2), and the like.

In addition, there is known a catalyst in which at least one of rhodium, cobalt, and nickel is supported as an active ingredient on a carrier using at least one of lanthanum aluminate, strontium titanate, and barium titanate which are perovskite-type compounds, for the purpose of suppressing carbon deposition and improving activity at a low temperature (see Patent Document 3).

As one general method for producing metal-supported catalysts, there is known an impregnation method in which an oxide to be a carrier is immersed in a solution of a metal salt or the like, and then heat treatment is performed to disperse an active metal on a surface of the carrier (see Patent Documents 1 to 3).

Since the carrier component is required to have high thermal stability and strength, the carrier component is sufficiently sintered by heat treatment at a high temperature, whereas the supported metal needs to maintain dispersibility to obtain high activity. Thus, in order to minimize aggregation in the heat treatment step, the metal is immobilized on the carrier under heat treatment conditions of a relatively low temperature using a production step, as in the above-described impregnation method, different from the synthesis of the carrier.

Although the catalyst produced by the impregnation method can maintain high metal dispersibility, an impregnation step of supporting metal component is required separately from a step of synthesizing the carrier component. In addition, since the metal component is fixed by heat treatment at a relatively low temperature, there arise problems that the bond between the metal and the carrier is weak, and the activity is decreased due to carbon deposition.

For this reason, as a method for producing a catalyst without using an impregnation step, there is proposed a method for synthesizing a composite oxide containing $BaNiY_2O_5$ by solid-phase synthesis to improve dispersibility of a Ni component (Patent Document 4).

Patent Document 1: Japanese Patent Application Laid-Open No. H8-231204
Patent Document 2: Japanese Patent Application Laid-Open No. H9-168740
Patent Document 3: Japanese Patent Application Laid-Open No. 2006-346598
Patent Document 4: Japanese Patent Application Laid-Open No. 2015-136668

SUMMARY OF THE INVENTION

Although the catalyst described in Patent Document 4 can suppress carbon deposition, it cannot be said that the activity is sufficiently high, and there is room for improvement.

The present invention has been made to solve the above-described problems, and it is an object of the present invention to provide a hydrocarbon reforming catalyst having high activity and a hydrocarbon reforming device including such a hydrocarbon reforming catalyst.

The hydrocarbon reforming catalyst according to the present invention is a catalyst that is used in production of a synthesis gas containing hydrogen and carbon monoxide from a hydrocarbon-based gas, and includes a composite oxide having a perovskite structure, wherein the composite oxide has at least one crystal phase among a first crystal phase containing $BaZrO_3$ as a main component and a second crystal phase containing $BaCeO_3$ as a main component, and contains Rh.

According to the present invention, it is possible to provide a highly active hydrocarbon reforming catalyst and a hydrocarbon reforming device including such a hydrocarbon reforming catalyst.

DETAILED DESCRIPTION OF THE PREFERRED EMBODIMENTS

Hereinafter, features of the present invention will be specifically described with reference to embodiments of the present invention.

The hydrocarbon reforming catalyst according to the present invention is a catalyst that is used in production of a synthesis gas containing hydrogen and carbon monoxide from a hydrocarbon-based gas, and satisfies the requirements (hereinafter referred to as requirements of the present invention) that the catalyst includes a composite oxide having a perovskite structure, wherein the composite oxide has at least one crystal phase among a first crystal phase containing $BaZrO_3$ as a main component and a second crystal phase containing $BaCeO_3$ as a main component, and contains Rh.

As the hydrocarbon-based gas that is the gas to be treated, for example, propane gas containing propane as a main component or natural gas containing methane as a main component can be used. Further, a hydrocarbon-based gas obtained by vaporizing a liquid hydrocarbon such as gasoline, kerosene, methanol, or ethanol can also be used.

A reaction for producing a synthesis gas containing hydrogen and carbon monoxide from a hydrocarbon-based gas will be described by taking steam reforming of propane gas as an example. The steam reforming of propane gas is represented by Formula (1).

$$C_3H_8 + 3H_2O \rightarrow 7H_2 + 3CO \quad (1)$$

However, the method for producing a synthesis gas containing hydrogen and carbon monoxide from a hydrocarbon-based gas is not limited to steam reforming. Other than steam, for example, oxygen, carbon dioxide, or a mixture thereof may be contained. The reforming reaction in the case of containing carbon dioxide is represented by Formula (2).

$$C_3H_8 + 3CO_2 \rightarrow 4H_2 + 6CO \quad (2)$$

Figure 1:
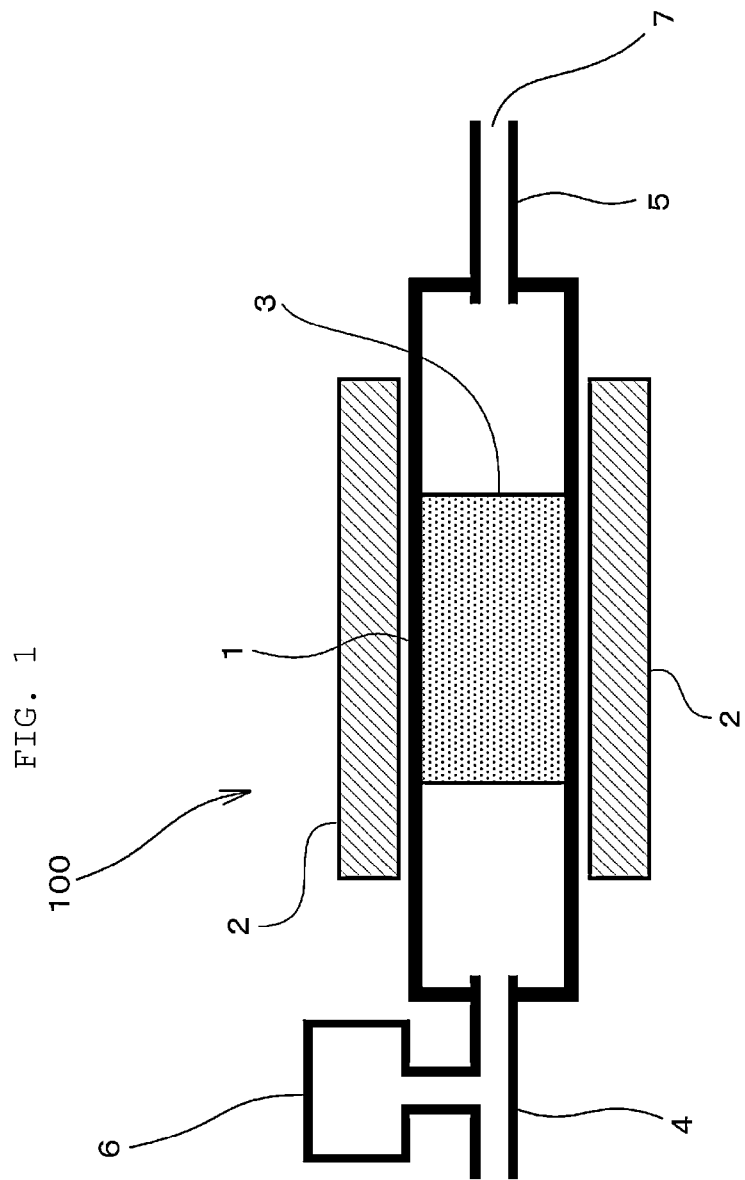
FIG. 1 is a diagram showing a schematic configuration of the hydrocarbon reforming device.

FIG. 1 is a diagram showing a schematic configuration of a hydrocarbon reforming device 100 that produces a synthesis gas containing hydrogen and carbon monoxide from a gas to be treated containing at least a hydrocarbon. The hydrocarbon reforming device 100 includes a tube 1 through which the gas to be treated flows, a heater 2 that heats the gas to be treated flowing through the tube 1, and a hydrocarbon reforming catalyst 3 disposed at in the tube 1 in a position to come into contact with the gas to be treated when the gas to be treated flows through the tube. The hydrocarbon reforming catalyst 3 is a catalyst satisfying the requirements of the present invention, and includes a composite oxide having a perovskite structure, wherein the composite oxide has at least one crystal phase among a first crystal phase containing $BaZrO_3$ as a main component and a second crystal phase containing $BaCeO_3$ as a main component, and contains Rh. When the gas to be treated itself has a sufficiently high temperature, the heater 2 can be omitted.

A gas supply pipe 4 is connected upstream of the tube 1. To the gas supply pipe 4, a hydrocarbon is supplied from a hydrocarbon supply source 6. The hydrocarbon supply source 6 may be provided at a preceding stage of the gas supply pipe 4. The hydrocarbon supplied from the hydrocarbon supply source 6 may contain other components.

A gas discharge pipe 5 for discharging a synthesis gas containing hydrogen and carbon monoxide obtained by reforming is connected downstream of the tube 1. The gas discharge pipe 5 is provided with a hydrogen outlet 7, and is configured to be able to separate out hydrogen contained in the synthesis gas. For example, a CO converter may be provided in the gas discharge pipe 5 to remove carbon monoxide contained in the synthesis gas and separate out hydrogen from the hydrogen outlet 7.

Examples 1 to 10

$BaCO_3$, $ZrO_2$, $CeO_2$, $Y_2O_3$, and $Rh_2O_3$ were prepared as materials of a hydrocarbon reforming catalyst and weighed such that the molar ratio of Ba:Zr:Ce:Y:Rh was the ratio shown in Table 1, and balls, water, and a binder were added thereto and wet-mixed to obtain a mixture. The obtained mixture was dried in an oven at a temperature of 120° C., and then pulverized and classified to provide grains having a size of about 2 mm. Thereafter, the grained sample was fired in an air atmosphere at 1,000° C. for 1 hour to obtain a hydrocarbon reforming catalyst of each of Examples 1 to 10.

The hydrocarbon reforming catalysts of Examples 1 to 10 are catalysts satisfying the requirements of the present invention. As shown in Table 1, the hydrocarbon reforming catalysts of Examples 1 to 10 contain Ba, Zr, Ce, Y, and Rh. The hydrocarbon reforming catalysts of Examples 1 to 5 each have the same molar ratios of Zr, Ce, and Y to Ba, but different molar ratios of Rh. The hydrocarbon reforming catalysts of Examples 6 to 10 each have different molar ratios of Zr, Ce, Y, and Rh to Ba.

Examples 11 to 15

$BaCO_3$, $ZrO_2$, $CeO_2$, and $Rh_2O_3$ were prepared as materials of a hydrocarbon reforming catalyst and weighed such that the molar ratio of Ba:Zr:Ce:Rh was the ratio shown in Table 1, and balls, water, and a binder were added thereto and wet-mixed to obtain a mixture. Thereafter, the hydrocarbon reforming catalysts of Examples 11 to 15 were produced by the same method as the method for producing the hydrocarbon reforming catalysts of Examples 1 to 10.

The hydrocarbon reforming catalysts of Examples 11 to 15 are catalysts satisfying the requirements of the present invention. As shown in Table 1, the hydrocarbon reforming catalysts of Examples 11 to 15 contain Ba, Zr, Ce, and Rh, but do not contain Y.

Examples 16 to 20

$BaCO_3$, $CeO_2$, $Y_2O_3$, and $Rh_2O_3$ were prepared as materials of a hydrocarbon reforming catalyst and weighed such that the molar ratio of Ba:Ce:Y:Rh was the ratio shown in Table 1, and balls, water, and a binder were added thereto and wet-mixed to obtain a mixture. Thereafter, the hydrocarbon reforming catalysts of Examples 16 to 20 were produced by the same method as the method for producing the hydrocarbon reforming catalysts of Examples 1 to 10.

The hydrocarbon reforming catalysts of Examples 16 to 20 are catalysts satisfying the requirements of the present invention. As shown in Table 1, the hydrocarbon reforming catalysts of Examples 16 to 20 contain Ba, Ce, Y, and Rh, but do not contain Zr.

Examples 21 to 23

$BaCO_3$, $ZrO_2$, $Y_2O_3$, and $Rh_2O_3$ were prepared as materials of a hydrocarbon reforming catalyst and weighed such that the molar ratio of Ba:Zr:Y:Rh was the ratio shown in Table 1, and balls, water, and a binder were added thereto and wet-mixed to obtain a mixture. Thereafter, the hydrocarbon reforming catalysts of Examples 21 to 23 were produced by the same method as the method for producing the hydrocarbon reforming catalysts of Examples 1 to 10.

The hydrocarbon reforming catalysts of Examples 21 to 23 are catalysts satisfying the requirements of the present invention. As shown in Table 1, the hydrocarbon reforming catalysts of Examples 21 to 23 contain Ba, Zr, Y, and Rh, but do not contain Ce.

Example 24

$BaCO_3$, $ZrO_2$, and $Rh_2O_3$ were prepared as materials of a hydrocarbon reforming catalyst and weighed such that the molar ratio of Ba:Zr:Rh was the ratio shown in Table 1, and balls, water, and a binder were added thereto and wet-mixed to obtain a mixture. Thereafter, the hydrocarbon reforming catalyst of Example 24 was produced by the same method as the method for producing the hydrocarbon reforming catalysts of Examples 1 to 10.

The hydrocarbon reforming catalyst of Example 24 is a catalyst satisfying the requirements of the present invention. As shown in Table 1, the hydrocarbon reforming catalyst of Example 24 contains Ba, Zr, and Rh, but does not contain Ce or Y.

Example 25

$BaCO_3$, $CeO_2$, and $Rh_2O_3$ were prepared as materials of a hydrocarbon reforming catalyst and weighed such that the molar ratio of Ba:Ce:Rh was the ratio shown in Table 1, and balls, water, and a binder were added thereto and wet-mixed to obtain a mixture. Thereafter, the hydrocarbon reforming catalyst of Example 25 was produced by the same method as the method for producing the hydrocarbon reforming catalysts of Examples 1 to 10.

The hydrocarbon reforming catalyst of Example 25 is a catalyst satisfying the requirements of the present invention. As shown in Table 1, the hydrocarbon reforming catalyst of Example 25 contains Ba, Ce, and Rh, but does not contain Zr or Y.

In the hydrocarbon reforming catalysts of Examples 1 to 25 described above, an impregnation step of supporting the metal component on a carrier is not required in the production step.

Comparative Example 1

$BaCO_3$, $ZrO_2$, $CeO_2$, $Y_2O_3$, and $Rh_2O_3$ were prepared as materials of a hydrocarbon reforming catalyst and weighed such that the molar ratio of Ba:Zr:Ce:Y:Rh was the ratio shown in Table 1, and balls, water, and a binder were added thereto and wet-mixed to obtain a mixture. The molar ratio of Ba:Zr:Ce:Rh in this mixture is the same as the molar ratio of Ba:Zr:Ce:Y:Rh of the materials used in production of the hydrocarbon reforming catalyst of Example 2. Thereafter, a hydrocarbon reforming catalyst of Comparative Example 1 was produced by the same method as the method for producing the hydrocarbon reforming catalyst of Example 2 except that the firing temperature was set to 500° C. The hydrocarbon reforming catalyst of Comparative Example 1 is a catalyst not satisfying the requirements of the present invention.

Comparative Example 2

$BaCO_3$, $ZrO_2$, $CeO_2$, and $Rh_2O_3$ were prepared as materials of a hydrocarbon reforming catalyst and weighed such that the molar ratio of Ba:Zr:Ce:Rh was the ratio shown in Table 1, and balls, water, and a binder were added thereto and wet-mixed to obtain a mixture. The molar ratio of Ba:Zr:Ce:Rh in this mixture is the same as the molar ratio of Ba:Zr:Ce:Y:Rh of the materials used in production of the hydrocarbon reforming catalyst of Example 14. Thereafter, a hydrocarbon reforming catalyst of Comparative Example 2 was produced by the same method as the method for producing the hydrocarbon reforming catalyst of Example 14 except that the firing temperature was set to 500° C. The hydrocarbon reforming catalyst of Comparative Example 2 is a catalyst not satisfying the requirements of the present invention.

<Conformation of Crystal Phase>

The hydrocarbon reforming catalysts of Examples 1 to 25 and Comparative Examples 1 and 2 described above were pulverized in a mortar, and the crystal phases were confirmed by powder XRD measurement. In the powder XRD measurement, Cu-Kα1 was used as an X-ray.

Table 1 shows crystal phases and compositions (molar ratios) confirmed for the hydrocarbon reforming catalysts of Examples 1 to 25 and Comparative Examples 1 and 2.

TABLE 1

| Catalyst | Crystal phase | Molar ratio | | | | |
|---|---|---|---|---|---|---|
| | | Ba | Zr | Ce | Y | Rh |
| Example 1 | $BaZrO_3$, $RaCeO_3$ | 1.00 | 0.60 | 0.30 | 0.10 | 0.04 |
| Example 2 | $BaZrO_3$, $BaCeO_3$ | 1.00 | 0.60 | 0.30 | 0.10 | 0.09 |
| Example 3 | $BaZrO_3$, $BaCeO_3$ | 1.00 | 0.60 | 0.30 | 0.10 | 0.13 |
| Example 4 | $BaZrO_3$, $BaCeO_3$, $BaCO_3$ | 1.00 | 0.60 | 0.30 | 0.10 | 0.22 |
| Example 5 | $BaZrO_3$, $BaCeO_3$, $BaCO_3$ | 1.00 | 0.60 | 0.30 | 0.10 | 0.43 |
| Example 6 | $BaZrO_3$, $BaCeO_3$, $V_2O_3$, $BaCO_3$ | 1.00 | 0.40 | 0.30 | 0.30 | 0.09 |
| Example 7 | $BaZrO_3$, $BaCeO_3$, $V_2O_3$, $BaCO_3$ | 1.00 | 0.30 | 0.30 | 0.40 | 0.09 |
| Example 8 | $BaZrO_3$, $BaCeO_3$, $V_2O_3$, $BaCO_3$ | 1.00 | 0.20 | 0.50 | 0.30 | 0.09 |
| Example 9 | $BaZrO_3$, $BaCeO_3$, $BaCO_3$ | 1.00 | 0.40 | 0.50 | 0.10 | 0.08 |
| Example 10 | $BaZrO_3$, $BaCeO_3$, $BaCO_3$ | 1.00 | 0.20 | 0.70 | 0.10 | 0.09 |
| Example 11 | $BaZrO_3$, $BaCeO_3$ | 1.00 | 0.90 | 0.10 | — | 0.08 |
| Example 12 | $BaZrO_3$, $BaCeO_3$ | 1.00 | 0.70 | 0.30 | — | 0.09 |
| Example 13 | $BaZrO_3$, $BaCeO_3$, $BaCO_3$ | 1.00 | 0.50 | 0.50 | — | 0.09 |
| Example 14 | $BaZrO_3$, $BaCeO_3$ | 1.00 | 0.30 | 0.70 | — | 0.09 |
| Example 15 | $BaZrO_3$, $BaCeO_3$ | 1.00 | 0.20 | 0.80 | — | 0.08 |
| Example 16 | $BaCeO_3$ | 1.00 | — | 0.90 | 0.10 | 0.08 |
| Example 17 | $BaCeO_3$, $BaCO_3$ | 1.00 | — | 0.70 | 0.30 | 0.09 |
| Example 18 | $BaCeO_3$, $Y_2O_3$, $BaCO_3$ | 1.00 | — | 0.60 | 0.40 | 0.09 |
| Example 19 | $BaCeO_3$, $Y_2O_3$, $BaCO_3$ | 1.00 | | 0.50 | 0.50 | 0.09 |
| Example 20 | $BaCeO_3$, $Y_2O_3$, $BaCO_3$ | 1.00 | — | 0.30 | 0.70 | 0.09 |
| Example 21 | $BaZrO_3$ | 1.00 | 0.90 | — | 0.10 | 0.09 |
| Example 22 | $BaZrO_3$, $BaCO_3$ | 1.00 | 0.70 | — | 0.30 | 0.09 |
| Example 23 | $BaZrO_3$, $Y_2O_3$, $BaCO_3$ | 1.00 | 0.60 | | 0.40 | 0.09 |
| Example 24 | $BaZrO_3$ | 1.00 | 1.00 | — | — | 0.09 |
| Example 25 | $BaCeO_3$ | 1.00 | — | 1.00 | — | 0.09 |
| Comparative Example 1 | $BaCO_3$, $ZrO_2$, $CeO_2$, $Y_2O_3$, $Rh_2O_3$ | 1.00 | 0.60 | 0.30 | 0.10 | 0.09 |
| Comparative Example 2 | $BaCO_3$, $ZrO_2$, $CeO_2$, $Rh_2O_3$ | 1.00 | 0.30 | 0.70 | — | 0.09 |

In the hydrocarbon reforming catalysts of Examples 1 to 25, it was confirmed that a crystal phase of the composite oxide having a perovskite structure, specifically, at least one crystal phase among a first crystal phase containing $BaZrO_3$ as a main component and a second crystal phase containing $BaCeO_3$ as a main component exists. More specifically, in the hydrocarbon reforming catalysts of Examples 1 to 15, the first crystal phase containing $BaZrO_3$ as a main component and the second crystal phase containing $BaCeO_3$ as a main component were confirmed. In the hydrocarbon reforming catalysts of Examples 16 to 20 and 25, the second crystal phase containing $BaCeO_3$ as a main component was confirmed. In the hydrocarbon reforming catalysts of Examples 21 to 24, the first crystal phase containing $BaZrO_3$ as a main component was confirmed.

In the hydrocarbon reforming catalysts of some examples, different phases such as $BaCO_3$ and $Y_2O_3$ depending on the composition ratio were also confirmed. However, in these hydrocarbon reforming catalysts, the main crystal phase of the composite oxide having a perovskite structure is at least one among the first crystal phase containing $BaZrO_3$ as a main component and the second crystal phase containing $BaCeO_3$ as a main component.

Figure 2:
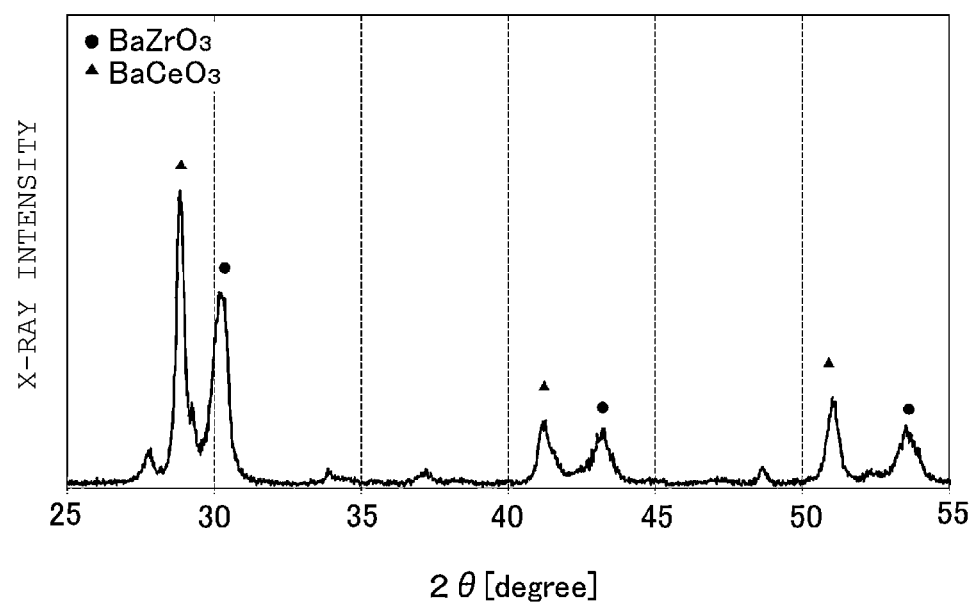
FIG. 2 is a graph showing the X-ray diffraction pattern of the hydrocarbon reforming catalyst of Example 2.

FIG. 2 shows the X-ray diffraction pattern of the hydrocarbon reforming catalyst of Example 2. As shown in FIG. 2, it can be confirmed that the first crystal phase belonging to $BaZrO_3$ and the second crystal phase belonging to $BaCeO_3$ exist in the hydrocarbon reforming catalyst of Example 2. On the other hand, diffraction lines originating from $Y_2O_3$, $Rh_2O_3$, and Rh alone were not observed.

That is, in the hydrocarbon reforming catalyst of Example 2, Y and Rh each exist in the structure of at least one among the first crystal phase containing $BaZrO_3$ as a main component and the second crystal phase containing $BaCeO_3$ as a main component. In other words, Y and Rh each exist as one component constituting the composite oxide having a perovskite structure.

Similarly, also in the hydrocarbon reforming catalysts of Examples 1, 3 to 10, and 16 to 23, Y and Rh each exist as one component constituting the composite oxide having a perovskite structure. In the hydrocarbon reforming catalysts of Examples 11 to 15, 24, and 25 in which Y is not contained in the composite oxide, Rh exists as one component constituting the composite oxide having a perovskite structure.

On the other hand, it was confirmed that the hydrocarbon reforming catalyst of Comparative Example 1 was a mixture of $BaCO_3$, $ZrO_2$, $CeO_2$, $Y_2O_3$, and $Rh_2O_3$ used for preparation since the firing temperature during production was 500° C. which was lower than the temperature of formation of the composite oxide having a perovskite structure. Similarly, it was confirmed that the hydrocarbon reforming catalyst of Comparative Example 2 was also a mixture of $BaCO_3$, $ZrO_2$, $CeO_2$, and $Rh_2O_3$ used for preparation.

It is noted that the composite oxides contained in the hydrocarbon reforming catalysts of Examples 1 to 15 have the first crystal phase containing $BaZrO_3$ as a main component and the second crystal phase containing $BaCeO_3$ as a main component and contain Zr, Ce, and Rh, and the molar ratio of Ce to Ba is 0.1 to 0.8.

Among the hydrocarbon reforming catalysts of Examples 1 to 15, the hydrocarbon reforming catalysts of Examples 1 to 10 have a structure in which the composite oxide further contains Y. Among the hydrocarbon reforming catalysts of Examples 1 to 15, the hydrocarbon reforming catalysts of Examples 11 to 15 have a structure in which the composite oxide does not contain Y.

In the hydrocarbon reforming catalysts of Examples 16 to 18, the composite oxide has the second crystal phase containing $BaCeO_3$ as a main component, but does not have the first crystal phase containing $BaZrO_3$ as a main component. The composite oxide contains Y and Rh, and the molar ratio of Y to Ba is 0.1 to 0.4.

<Confirmation of Composition>

Each of the hydrocarbon reforming catalysts of Examples 1 to 25 and the hydrocarbon reforming catalysts of Comparative Examples 1 and 2 was finely pulverized in a mortar, and the obtained powder was subjected to composition analysis by fluorescent X-ray analysis (XRF analysis). From the results, it was confirmed that for all the hydrocarbon reforming catalysts subjected to the composition analysis, the element molar ratio assigned at the time of weighing was maintained, that is, change in the element molar ratio such as decrease in each component due to the heat firing treatment did not occur.

<Evaluation of Reforming>

Each of the hydrocarbon reforming catalysts of Examples 1 to 25 and Comparative Examples 1 and 2 was pulverized and classified to provide those having a size of 0.5 mm to 0.7 mm, and then an evaluation test of steam reforming of propane gas was performed by the following method.

The tube 1 of the hydrocarbon reforming device 100 shown in FIG. 1 was filled with 0.3 g of a hydrocarbon reforming catalyst produced by the above-described method and heated at 600° C. by the heater 2. Then, as raw material gases, nitrogen ($N_2$) at a flow rate of 350 cc/min, propane ($C_3H_8$) at 7 cc/min, steam ($H_2O$) at 60 cc/min, and carbon dioxide ($CO_2$) at 60 cc/min were introduced from the gas supply pipe 4.

The raw material gases introduced into the tube 1 are reformed, and the synthesis gas containing oxygen and carbon monoxide is discharged from the gas discharge pipe 5. The synthesis gas discharged from the gas discharge pipe 5 was introduced into a gas analyzer (gas chromatograph) after removal of moisture by a cooling-type trap, and the hydrogen concentration was measured.

The equilibrium gas composition under the above-described gas partial pressure and temperature conditions was calculated, finding that the proportion of the hydrogen gas concentration in the equilibrium state was 8.1 vol % when moisture was removed. Thus, when the reaction of the introduced raw material gases proceeds to 100% completion, the concentration of hydrogen discharged from the gas discharge pipe 5 in the equilibrium state (hereinafter, referred to as equilibrium hydrogen concentration) is 8.1 vol %.

(I) Confirmation of Initial Activity

The initial activity of the hydrocarbon reforming catalyst was confirmed by measuring the hydrogen concentration after 1 hour (initial hydrogen concentration), on the presumption that no sulfur component was present in the first 1 hour from the introduction of the raw material gases. Table 2 shows the concentration of hydrogen discharged from the gas discharge pipe 5 (initial hydrogen concentration) and the equilibrium attainment rate of initial activity when each of the hydrocarbon reforming catalysts of the examples and the comparative examples was used. The equilibrium attainment rate of the initial activity was defined by Formula (3):

Equilibrium attainment rate of initial activity=initial hydrogen concentration/equilibrium hydrogen concentration×100       (3)

(II) Confirmation of Properties after Sulfur Degradation

After the confirmation of the initial activity, $SO_2$ gas was mixed so as to have a proportion of 50 ppm based on 477 cc/min which is the total flow rate of the raw material gases, and the hydrogen gas concentration after 1 hour was measured to confirm degradation in activity of the catalyst in the presence of sulfur. Table 2 shows the concentration of hydrogen discharged from the gas discharge pipe 5 after 1 hour in the presence of sulfur and the equilibrium attainment rate when each of the hydrocarbon reforming catalysts of the examples and the comparative examples was used. In Table 2, those are expressed as "hydrogen concentration after sulfur degradation" and "equilibrium attainment rate after sulfur degradation". The equilibrium attainment rate after sulfur degradation was defined by Formula (4).

Equilibrium attainment rate after sulfur degradation=hydrogen concentration after sulfur degradation/equilibrium hydrogen concentration×100       (4)

After the completion of the test, in order to confirm the presence or absence of carbon deposition, the hydrocarbon reforming catalyst was cooled in an $N_2$ atmosphere and taken out, and the weight change of the catalyst due to carbon combustion was examined by thermogravimetric differential thermal analysis (TG-DTA). Carbon deposition was not confirmed in all the hydrocarbon reforming catalysts of the examples and the comparative examples evaluated.

TABLE 2

| Catalyst | Hydrogen concentration (vol %) | | Equilibrium attainment rate of initial activity | Equilibrium attainment rate after sulfur degradation |
| --- | --- | --- | --- | --- |
| | Initial | After sulfur degradation | | |
| Example 1 | 7.8 | 7.0 | 96% | 86% |
| Example 2 | 8.1 | 7.9 | 100% | 98% |

TABLE 2-continued

| Catalyst | Hydrogen concentration (vol %) | | Equilibrium attainment rate of initial activity | Equilibrium attainment rate after sulfur degradation |
|---|---|---|---|---|
| | Initial | After sulfur degradation | | |
| Example 3 | 8.1 | 8.1 | 100% | 100% |
| Example 4 | 8.1 | 8.1 | 100% | 100% |
| Example 5 | 8.1 | 8.1 | 100% | 100% |
| Example 6 | 7.5 | 0.0 | 93% | 0% |
| Example 7 | 6.7 | 0.0 | 83% | 0% |
| Example 8 | 8.1 | 6.6 | 100% | 81% |
| Example 9 | 8.0 | 7.6 | 99% | 94% |
| Example 10 | 8.1 | 6.8 | 100% | 84% |
| Example 11 | 8.1 | 7.1 | 100% | 88% |
| Example 12 | 8.0 | 7.3 | 99% | 90% |
| Example 13 | 8.0 | 6.6 | 99% | 81% |
| Example 14 | 8.1 | 5.8 | 100% | 72% |
| Example 15 | 8.1 | 4.7 | 100% | 58% |
| Example 16 | 7.9 | 4.2 | 98% | 52% |
| Example 17 | 8.0 | 6.6 | 99% | 81% |
| Example 18 | 8.1 | 6.1 | 100% | 75% |
| Example 19 | 5.3 | 0.0 | 65% | 0% |
| Example 20 | 4.6 | 0.0 | 57% | 0% |
| Example 21 | 7.1 | 0.0 | 88% | 0% |
| Example 22 | 7.9 | 1.9 | 98% | 23% |
| Example 23 | 7.5 | 0.8 | 93% | 10% |
| Example 24 | 7.1 | 0.0 | 88% | 0% |
| Example 25 | 7.5 | 3.3 | 93% | 41% |
| Comparative Example 1 | 1.3 | 0.0 | 16% | 0% |
| Comparative Example 2 | 1.1 | 0.0 | 14% | 0% |

<Initial Activity>

As shown in Table 2, when the hydrocarbon reforming catalysts of Examples 1 to 25 satisfying the requirements of the present invention were used, the equilibrium attainment rate of the initial activity was a value higher than 40%, more specifically, 57% or higher. On the other hand, when the hydrocarbon reforming catalysts of Comparative Examples 1 and 2 not satisfying the requirements of the present invention were used, the equilibrium attainment rate of the initial activity was a value as low as 16% or lower.

That is, in the hydrocarbon reforming catalysts not satisfying the requirements of the present invention, the equilibrium attainment rate of the initial activity is lower than 40%, which is not suitable for practical use. However, in the hydrocarbon reforming catalysts satisfying the requirements of the present invention, the equilibrium attainment rate of the initial activity is higher than 40%, which is suitable for practical use.

The reason why the hydrocarbon reforming catalysts satisfying the requirements of the present invention have high initial activity is considered as follows. The Rh component is stabilized by solid solution dispersion in the composite oxide having at least one crystal phase among a first crystal phase containing $BaZrO_3$ as a main component and a second crystal phase containing $BaCeO_3$ as a main component and having a perovskite structure, so that aggregation and volatilization of the Rh component under high-temperature oxidation conditions can be suppressed. As a result, the activity is improved.

In the hydrocarbon reforming catalysts of Examples 1 to 25, the molar ratio of Rh to Ba contained in the composite oxide is 0.04 to 0.43. That is, when the molar ratio of Rh to Ba contained in the composite oxide is 0.04 to 0.43, a hydrocarbon reforming catalyst having high activity can be obtained.

On the other hand, the hydrocarbon reforming catalysts of the comparative examples not satisfying the requirements of the present invention do not have the crystal phase of a perovskite structure. Hence, it is considered that the structure as described above, that is, the structure in which the Rh component is dispersed as a solid solution in the composite oxide having a perovskite structure cannot be obtained, so that the initial activity is lowered.

In addition, among the hydrocarbon reforming catalysts satisfying the requirements of the present invention, when the hydrocarbon reforming catalysts of Examples 1 to 18 and 21 to 25 in which the composite oxides further contained Y having a molar ratio to Ba of 0.4 or less were used, the equilibrium attainment rate of the initial activity was a higher value, that is, 83% or more. Thus, in the hydrocarbon reforming catalyst satisfying the requirements of the present invention, it is preferable that the composite oxide contain Y having a molar ratio to Ba of 0.4 or less. However, the configuration "containing Y having a molar ratio to Ba of 0.4 or less" also includes a configuration in which Y is not contained in the composite oxide (Examples 11 to 15, 24, and 25). That is, in the hydrocarbon reforming catalysts of Examples 1 to 18 and 21 to 25, it can also be said that Y having a molar ratio to Ba of 0 to 0.4 is contained in the composite oxides.

<Sulfur Resistance>

As shown in Table 2, among the hydrocarbon reforming catalysts satisfying the requirements of the present invention, when the hydrocarbon reforming catalysts of Examples 1 to 5, 8 to 18, and 25 in which the composite oxides further contained Ce and Y having a molar ratio to Ce of 0.8 or less (more specifically, 0.67 or less) were used, the equilibrium attainment rate after sulfur degradation was 41% or more. On the other hand, when the hydrocarbon reforming catalysts of Examples 6, 7 and 19 to 24 in which the composite oxides did not contain Ce or contained Y having a molar ratio to Ce of more than 0.8 were used, the equilibrium attainment rate after sulfur degradation was a value as low as 23% or less. Thus, in the hydrocarbon reforming catalyst satisfying the requirements of the present invention, it is preferable that the composite oxide further contain Ce and Y having a molar ratio to Ce of 0.8 or less. However, the configuration "containing Y having a molar ratio to Ce of 0.8 or less" also includes a configuration in which Y is not contained in the composite oxide (Examples 11 to 15 and 25). That is, in the hydrocarbon reforming catalysts of Examples 1 to 5, 8 to 18, and 25, it can also be said that Ce and Y having a molar ratio to Ce of 0 to 0.8 are contained in the composite oxides.

The reason why the hydrocarbon reforming catalysts of Examples 1 to 5, 8 to 18, and 25 have high sulfur durability is considered as follows. Since the Rh component is dispersed as a solid solution in the composite oxide, the bonding strength is strong, and the effects of suppressing adsorption of poison components such as sulfur and formation of compounds are obtained. In addition, since Ce and Y having a molar ratio to Ce of 0.8 or less is further contained in the composite oxide, the above effects of suppressing adsorption of poison components and formation of compounds are improved.

The present invention is not limited to the above-described embodiments, and various applications and modifications can be made within the scope of the present invention.

Although the hydrocarbon reforming catalyst of the example described above has a grained form, for example, it may be used as a typical metal-supported catalyst in which a powdery hydrocarbon reforming catalyst is supported on a ceramic or metal substrate. In addition, without using the substrate, the catalyst powder may be molded by a method such as press molding or extrusion molding and used in a form such as a pellet shape, a ring shape, or a honeycomb shape.

DESCRIPTION OF REFERENCE SYMBOLS

1: Tube
2: Heater
3: Hydrocarbon reforming catalyst
4: Gas supply pipe
5: Gas discharge pipe
6: Hydrocarbon supply source
7: Hydrogen outlet
100: Hydrocarbon reforming device

The invention claimed is:

1. A hydrocarbon reforming catalyst that is used in production of a synthesis gas containing hydrogen and carbon monoxide from a hydrocarbon-based gas, the hydrocarbon reforming catalyst comprising:
a composite oxide having a perovskite structure,
wherein the composite oxide has a first crystal phase containing $BaZrO_3$ as a main component and a second crystal phase containing $BaCeO_3$ as a main component, and contains Rh.

2. The hydrocarbon reforming catalyst according to claim 1, wherein a molar ratio of Rh to Ba is 0.04 to 0.43.

3. The hydrocarbon reforming catalyst according to claim 2, wherein the composite oxide further contains Y having a molar ratio to Ba of 0.4 or less.

4. The hydrocarbon reforming catalyst according to claim 1, wherein the composite oxide further contains Y having a molar ratio to Ba of 0.4 or less.

5. The hydrocarbon reforming catalyst according to claim 1, wherein the composite oxide further contains Ce and Y having a molar ratio to Ce of 0.8 or less.

6. The hydrocarbon reforming catalyst according to claim 1, wherein
the composite oxide further contains Zr, and
a molar ratio of Ce to Ba is 0.1 to 0.8.

7. The hydrocarbon reforming catalyst according to claim 6, wherein the composite oxide further contains Y.

8. The hydrocarbon reforming catalyst according to claim 6, wherein the composite oxide does not contain Y.

9. A hydrocarbon reforming device comprising:
a tube through which a gas to be treated containing at least a hydrocarbon flows; and
the hydrocarbon reforming catalyst according to claim 1 disposed inside the tube in a position to come into contact with the gas to be treated when the gas to be treated flows through the tube.

10. The hydrocarbon reforming device according to claim 9, wherein a molar ratio of Rh to Ba in the composite oxide is 0.04 to 0.43.

11. The hydrocarbon reforming device according to claim 10, wherein the composite oxide further contains Y having a molar ratio to Ba of 0.4 or less.

12. The hydrocarbon reforming device according to claim 9, wherein the composite oxide further contains Y having a molar ratio to Ba of 0.4 or less.

13. The hydrocarbon reforming device according to claim 9, wherein the composite oxide further contains Ce and Y having a molar ratio to Ce of 0.8 or less.

14. The hydrocarbon reforming device according to claim 9, wherein
the composite oxide further contains Zr, and
a molar ratio of Ce to Ba is 0.1 to 0.8.

15. The hydrocarbon reforming device according to claim 14, wherein the composite oxide further contains Y.

16. The hydrocarbon reforming device according to claim 14, wherein the composite oxide does not contain Y.

17. A hydrocarbon reforming catalyst that is used in production of a synthesis gas containing hydrogen and carbon monoxide from a hydrocarbon-based gas, the hydrocarbon reforming catalyst comprising:
a composite oxide having a perovskite structure,
wherein the composite oxide has at least one crystal phase among a first crystal phase containing $BaZrO_3$ as a main component and a second crystal phase containing $BaCeO_3$ as a main component, and contains Rh and Y, and
wherein a molar ratio of Y to Ba is:
0.1 to 0.4 when the complex oxide has both the first and second crystal phases,
0.1 to 0.4 when the complex oxide has only the first crystal phase, and
0.1 to 0.7 when the complex oxide has only the second crystal phase.

18. The hydrocarbon reforming catalyst according to claim 17, wherein a molar ratio of Rh to Ba is 0.04 to 0.43.

19. The hydrocarbon reforming catalyst according to claim 17, wherein the composite oxide further contains Ce, and a molar ratio of Y to Ce is 0.8 or less.

20. The hydrocarbon reforming catalyst according to claim 17, wherein
the composite oxide has the first crystal phase containing $BaZrO_3$ as a main component and the second crystal phase containing $BaCeO_3$ as a main component, and further contains Zr, and
a molar ratio of Ce to Ba is 0.1 to 0.8.

* * * * *